June 2, 1959  W. CZARNOCKI  2,888,805
HYDRAULIC SYSTEMS FOR TRACTORS
Filed Feb. 16, 1954  3 Sheets-Sheet 1
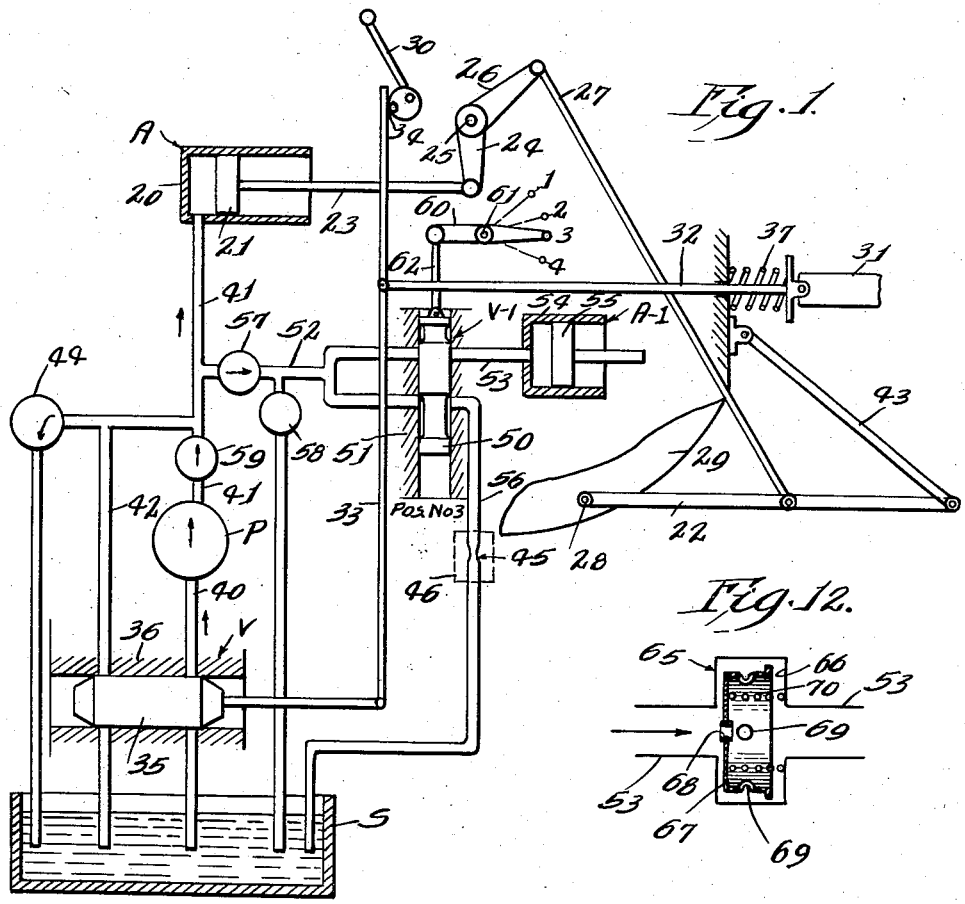
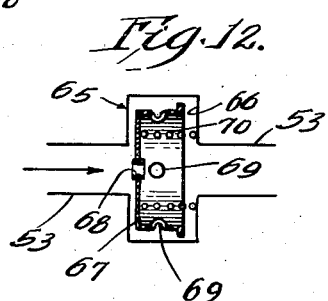
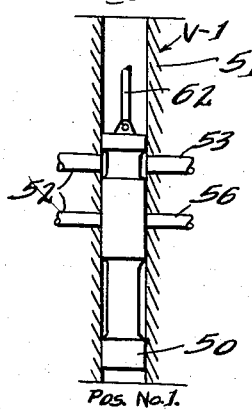
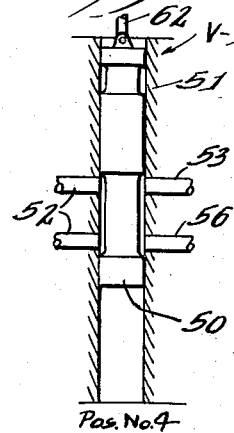
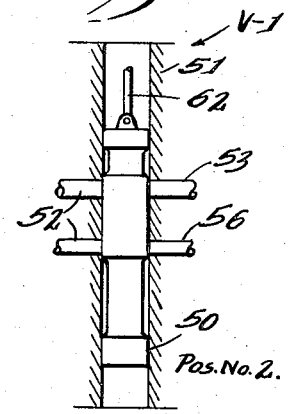
Inventor.
Witold Czarnocki.
By Carlson, Pitzner, Hubbard & Wolfe
Attorneys.

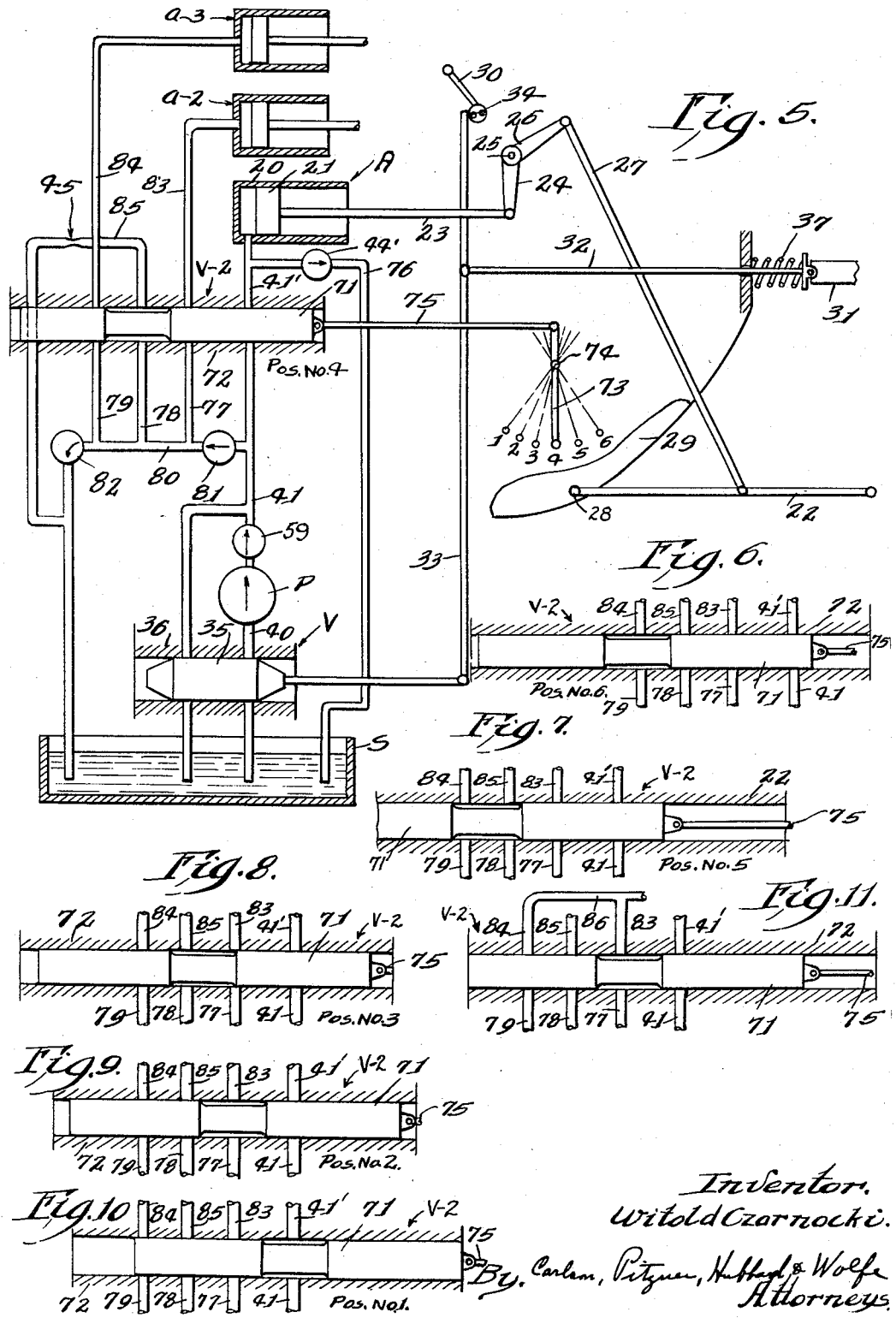

June 2, 1959     W. CZARNOCKI     2,888,805
HYDRAULIC SYSTEMS FOR TRACTORS
Filed Feb. 16, 1954     3 Sheets-Sheet 3
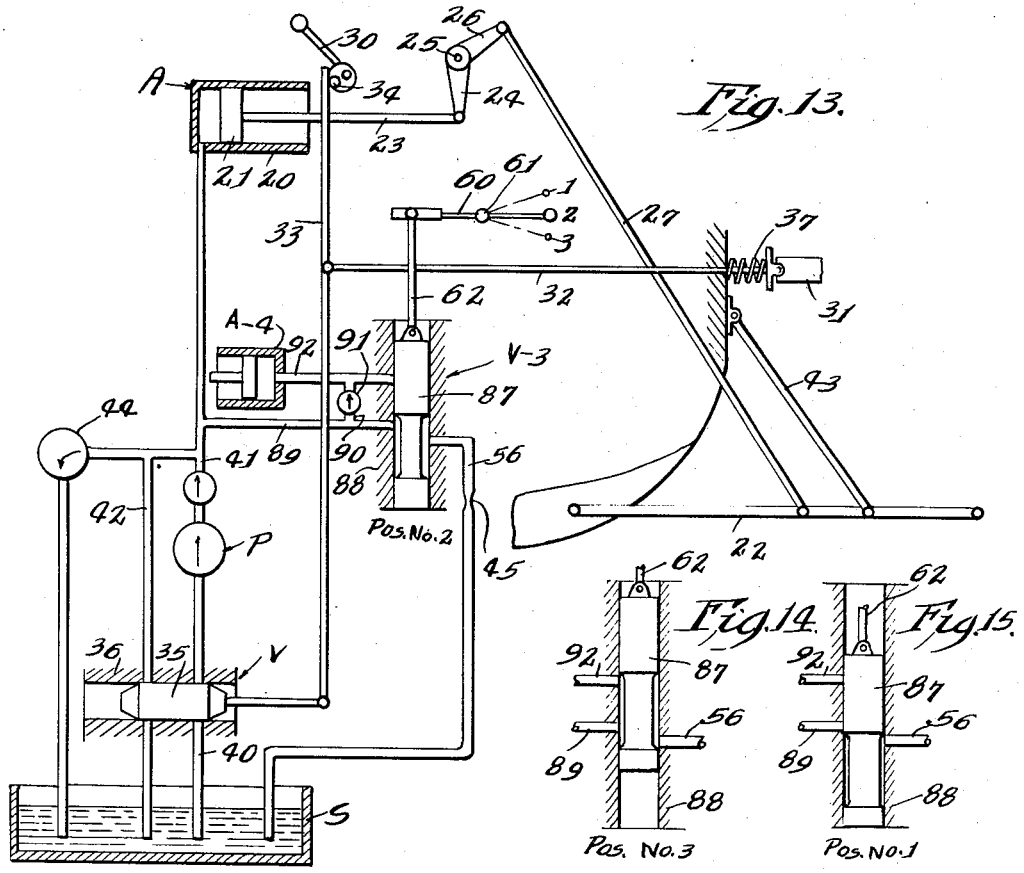
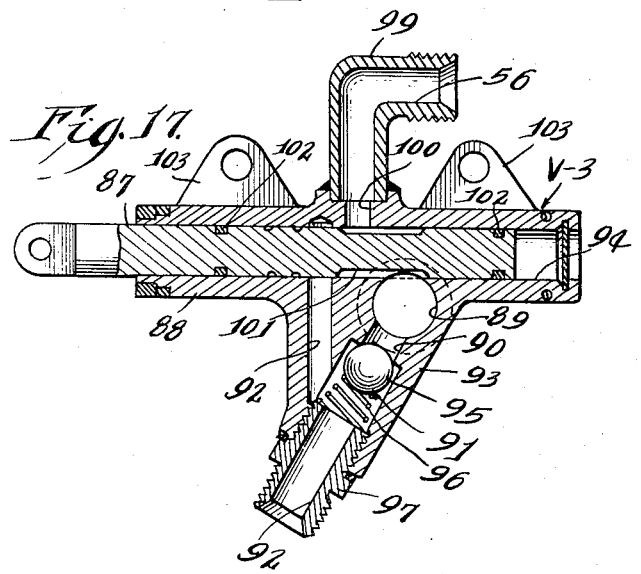
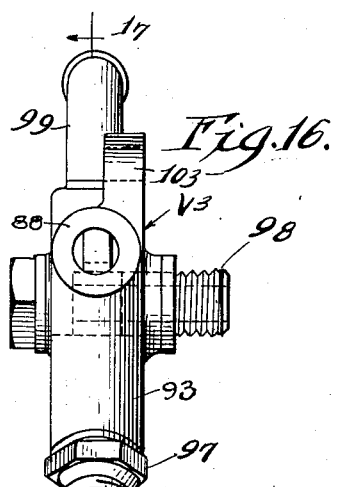
Inventor.
Witold Czarnocki.
By Carlson, Pitzner, Hubbard & Wolfe
Attorneys.

United States Patent Office 2,888,805
Patented June 2, 1959

2,888,805

HYDRAULIC SYSTEMS FOR TRACTORS

Witold Czarnocki, Coventry, England, assignor to Massey-Harris-Ferguson (Sales) Limited, Coventry, Warwickshire, England, a British company Application February 16, 1954, Serial No. 410,658

Claims priority, application Great Britain February 18, 1953

1 Claim. (Cl. 60—52)

The invention is concerned with the adaptation of hydraulic systems such as those provided on tractors for the operation of auxiliary equipment, and it has for its primary object the provision of an improved auxiliary hydraulic system for effecting such adaptation.

A more specific object is to provide an auxiliary hydraulic system which modifies the action of the main hydraulic system of the tractor so as to insure a constantly available supply of fluid under pressure for the prompt operation of the auxiliary equipment.

It is also an object of the invention to provide an auxiliary hydraulic system of the above general character which is simple in construction, which is easy to install on the tractor and which permits normal use of the main hydraulic system whenever desired.

Other objects and advantages of the invention will become apparent from the following detailed description of the preferred embodiments illustrated in the accompanying drawings in which:

Figure 1 is a diagrammatic view of a tractor hydraulic system having associated with it one form of auxiliary hydraulic system embodying the features of the invention.

Figs. 2, 3 and 4 are diagrammatic views showing different positions of the selector valve Fig. 1.

Fig. 5 is a diagrammatic view of a tractor hydraulic system having associated with it another form of auxiliary hydraulic system embodying the features of the invention.

Figs. 6, 7, 8, 9 and 10 are diagrammatic views showing different positions of the selector valve of Fig. 5.

Fig. 11 is a diagrammatic view of the selector valve of Fig. 5 showing the hydraulic connections modified to provide for the operation of a single auxiliary actuator.

Fig. 12 is a sectional view of a combined check and flow restricting valve.

Fig. 13 is a diagrammatic view of a tractor hydraulic system having associated with it still another form of auxiliary hydraulic system embodying the features of the invention.

Figs. 14 and 15 are diagrammatic views showing the selector valve of Fig. 13 in different positions.

Fig. 16 is an end elevational view of the selector valve of Fig. 13.

Fig. 17 is a sectional view of the selector valve taken in a vertical plane substantially on the line 17—17 of Fig. 16.

While certain preferred embodiments of the invention have been shown and will be described in some detail herein, it is not intended to limit the invention to the particular arraangements shown. The invention is to cover all modifications, adaptations and alternative arrangements falling within the spirit and scope of the invention as expressed in the appended claim.

For purposes of illustration, the invention has been shown as embodied in auxiliary hydraulic systems particularly well adapted for but not restricted to use with a main hydraulic system arranged for automatic draft control as employed in the well-known Ferguson tractor.

It is to be understood, however, that the invention may be used to advantage with other types of hydraulic systems. In the exemplary system there is a main hydraulic actuator or one-way ram A supplied with fluid from a pump P driven by the tractor engine Provision is made for interrupting the operation of the pump during idle periods of the main actuator, the interruption in this instance being effected through the medium of a control valve V arranged to close the pump intake. The load on the pump is thus reduced and unnecessary aeration and heating of the fluid is avoided.

The invention provides for the conversion of such a system for continuous pump operation so that a supply of fluid under pressure is continuously available for the operation of auxiliary equipment but without imposing an undue load on the pump or causing aeration or excessive heating of the fluid. To this end the invention provides an auxiliary hydraulic system adapted to be operatively connected to the main hydraulic system and embodying selector means whereby the pump discharge, that is the pressurized fluid delivered by the pump, may be directed to an auxiliary hydraulic actuator or actuators when such are to be operated, or alternatively may be directed to exhaust through a flow restricting passage during the idle periods of the actuators.

The auxiliary hydraulic systems of the invention may be arranged for operation with mechanical locking of the main actuator against operation, or the auxiliary system itself may act to hydraulically lock the main actuator. In either case, the main hydraulic system may be restored for its normal mode of operation without any changes or readjustment of its internal mechanism.

In the exemplary main hydraulic system shown in Figs. 1, 5 and 13, the main actuator A comprises a cylinder 20 with a working piston 21 operatively connected with draft links 22 constituting a part of the hitch linkage for attaching implements to the tractor. The arrangement is such that the draft links are swung upwardly or raised when the piston 21 is shifted rearwardly by admission of pressure fluid to the closed end of the cylinder 20. The draft links and attached implement are lowered by gravity and the piston is forced back in the cylinder when the fluid in the system is permitted to exhaust to the sump or reservoir in which it is stored.

To provide for raising and lowering the draft links, the piston 21 is connected by a piston rod 23 with a crank arm 24 fast on a lift shaft 25 journaled on the tractor body. The main actuator as well as the pump P and valve V are enclosed within the tractor body. Externally of the tractor body, the lift shaft 24 carries at its opposite ends rigid crank arms 26 connected by drop links 27 with the draft links 22. As is customary in tractors of the type under consideration, the draft links are trailingly pivoted as at 28 at their forward ends on the tractor body 29 for vertical and limited lateral swinging movement.

In the hydraulic system of the Ferguson tractor, the control valve V is operated jointly under control of a manually operable quadrant lever 30 and a top or control link 31 forming an element of the hitch linkage. The top link 31 is connected in a well known manner between an elevated part of the implement coupled to the draft links 22 and to an axially shiftable control plunger 32 supported on the tractor body. As shown diagrammatically in the drawings, the control plunger is operatively connected at its inner or forward end with a valve operating lever 33 which at its upper end has a fulcrum 34 adapted to be variably positioned by a manipulation of the quadrant lever 30.

At its lower end, the lever 33 is operatively connected with the movable member of the valve V which, in this instance, comprises a plunger 35 slidable within a bore in a casing 36. A control spring 37 acting between the tractor body and the control plunger 32 resists forward movement of the control plunger by the top link. This arrangement of the elements of the system provides automatic draft or depth control in the Ferguson tractor wherein a desired working depth of the implement is determined by positioning the quadrant lever 30 and the selected depth is maintained in well known manner through the action of the top link and control elements associated therewith.

As will be seen by reference to the drawings, the control valve V of the exemplary main hydraulic system is connected to control the suction side of the pump P. Thus the valve plunger is operative in the position shown in Figs. 1, 5 and 13 to close the pump intake 40 through which the pump draws fluid, such as oil, from a sump or reservoir S within the tractor body. With the intake closed, the pumping action is interrupted, that is, delivery of fluid under pressure ceases although the pump continues to be driven. The shifting of the valve plunger 35 to the left or to "lift" position opens the pump intake and the pump discharges pressurized fluid by way of a discharge passage or conduit 41 shown in Fig. 1 as connecting directly with the closed end of the actuator cylinder 20. Delivery of the fluid to the main actuator shifts the piston 21 in a direction to raise the hitch linkage.

The valve V also controls the lowering of the hitch linkage by controlling the exhaust of fluid from the actuator cylinder through a drain or exhaust passage 42 herein shown as branching from the pump discharge 41. The passages 40 and 42 open into the bore of the valve casing 36 in axially spaced relation so that both are closed by the valve plunger 35 when the plunger is in its central or neutral position. Under those conditions, the pumping action is interrupted and the escape of fluid from the main cylinder 20 is blocked thereby effectively restraining the piston 21 against movement in either direction. Movement of the valve plunger to the left opens the pump intake as above explained while movement of the valve plunger in the opposite direction, or to the right, opens the exhaust while the pump intake remains closed. In the latter or "lower" position of the valve, fluid is exhausted from the main cylinder 20 by reason of the load applied through the hitch linkage and the hitch linkage is lowered. In practice, the exhaust port of the valve V is usually of relatively small area to enable it to restrict the flow of fluid and thus limit the rate at which the linkage swings downwardly.

It is often desirable to utilize the pressure fluid of a tractor hydraulic system of the above type for the operation of auxiliary equipment either on the tractor or on an implement coupled to the tractor by the hitch linkage. With this in view, suitable externally accessible connections are conveniently provided on the tractor for connection of the auxiliary actuators to receive pressurized fluid from the pump P and to return spent fluid to the sump. When the lifting action of the main actuator is not required, the actuator may be locked against operation in any preferred manner, for example, by means of rigid struts or stay bars 43 connected between the tractor body and the trailing ends of the draft links 22 as shown in Fig. 1. Under such conditions, the draft control action afforded by the top link connection with the implement is rendered ineffective and starting and stopping of pump action is effected solely through manipulation of the quadrant lever 30 to actuate the valve V. To protect the system against excessive pressures, a relief valve 44 adapted to open at a predetermined pressure, is connected to the pump discharge to by-pass fluid to the sump. As this valve is primarily a safety valve, it is set to open at a relatively high pressure and consequently it is undesirable to maintain a flow through it for any substantial time.

The present invention has the advantage that even though the draft linkage is, or may be mechanically locked, in pressurizing the main system, nevertheless blowing of oil through the safety valve is prevented and likewise damage that might otherwise result to it. Proposals have been made heretofore for loading the system back upon itself to bring about interruption of pump action before blowing oil through the safety valve as shown in the patents to Chambers No. 2,592,393, issued April 8, 1952, and Heitshu No. 2,638,045, issued May 12, 1953. The present invention represents a further improvement in the adaptation of the system for the operation of auxiliaries and insures prompt response of the auxiliary actuator by maintaining a supply of pressure fluid available continuously.

It will be observed that the three exemplifications of the novel auxiliary hydraulic systems herein illustrated have in common the use of a valve or other means defining a flow restricting passage and selector means preferably in the form of a multi-position valve. Those elements are interconnected with the main hydraulic system so that the selector means is operable to connect the discharge of the pump of the main system to an auxiliary actuator or actuators or to exhaust through the flow restricting passage. In the latter case, the pump operates continuously and thus provides a continuously available supply of pressurized fluid for prompt operation of the auxiliary actuator, the pressure of the fluid of this system being determined by the degree of restriction of the flow restricting passage. To attain the advantages contemplated by the invention, the restriction is selected so that pressure in the system is maintained at a value effective to permit prompt operation of an auxiliary actuator yet not high enough to produce objectionable aeration or excessive heating of the fluid. While the flow restricting means may comprise a spring loaded valve or a needle valve, if desired, it has been exemplified here as a simple orifice 45 formed in a suitable body 46 adapted for the attachment of conduits for connecting it into the system.

One form of the improved hydraulic system as shown in Figs. 1–4 of the drawings, is particularly well suited for uses where an auxiliary actuator A–1 is to be operated from the main hydraulic system and where it is feasible to lock the main actuator A in an inoperative position. In the exemplary system the selector means comprises a valve V–1 having a movable member or plunger 50 shiftable axially within the bore of the casing 51 into any one of four different positions. A passage or conduit 52 connects the main pump discharge passage 41 with the valve, in this instance by way of two axially spaced ports in the valve casing.

Another port of the valve casing is connected by a passage or conduit 53 with the auxiliary actuator A–1. This actuator as shown is a one-way ram comprising a cylinder 54 with a piston 55 working therein. The conduit 53 opens into the closed end of the cylinder 54.

Still another port in the valve casing 51 opens to a drain conduit or exhaust passage 56 leading to the sump S. The flow restricting means or orifice 45 is interposed in this exhaust passage.

It is also desirable to interpose a check valve 57 in the auxiliary fluid supply passage or conduit 52 to prevent the load on the auxiliary actuator from having any effect on the main hydraulic system. To protect the auxiliary hydraulic system against excessive pressure, a pressure relief valve 58 is also connected to the supply passage 52 between the check valve and the selector valve. In the exemplary system another check valve 59 is interposed in the pump discharge between the pump P and the branch conduit 52 of the auxiliary hydraulic system.

Suitable means, such as a hand lever 60, is provided for shifting the valve plunger 50 of the selector valve V–1 between its various positions. It is contemplated that the valve will be mounted on the tractor body as explained in more detail hereinafter, and the lever 60 will likewise be pivoted as at 61 on the tractor body or on a bracket attached thereto. A rigid link 62 provides an operative connection between the hand lever and the valve plunger.

The connection of the pump discharge to the auxiliary actuator is effected by shifting the valve plunger 50 to the No. 1 position in which it is shown in Fig. 2. In this position, the valve plunger interrupts communication between the supply passage and the exhaust so that full pump pressure may build up in the main and auxiliary hydraulic systems for effective operation of the auxiliary actuator. If the valve plunger is now moved to the No. 2 position shown in Fig. 4, the supply conduit 53 for the auxiliary actuator is blocked so as to restrain the piston 55 from moving in either direction. The pressure supply passage 52 also remains closed thus conditioning the main hydraulic system for normal operation upon release of the main actuator by disconnection of the stay bars 43. The pressure relief valve 44 protects the main system against excessive pressure when the valve is in the No. 2 position, although, of course, it is desirable to stop the pump action by operation of the control valve V.

To effect return of the auxiliary actuator to retracted position, the valve plunger 50 is shifted to its No. 4 position, as shown in Fig. 3. This connects the supply conduit 53 to the exhaust passage 56 so that the fluid in the cylinder 54 may return to the sump by way of the orifice 45. At the same time, the pump discharge is connected to exhaust by way of the orifice 45 to relieve the pressure in the main hydraulic system.

It may be desirable to restrict the return movement of the piston 55 to a greater degree than is afforded by exhausting spent pressure fluid through the orifice 45. Under such conditions, a combined check and flow restricting valve may be interposed in the conduit 53 between the selector valve and the auxiliary actuator. A valve 65 suitable for that purpose is illustrated diagrammatically in Fig. 12. The valve comprises a casing defining a chamber 66 into opposite ends of which the conduit 53 connects. Within the chamber is disposed a generally cup shape movable valve member 67 having a restricted flow port 68 in its end wall and a plurality of additional ports 69 in its side wall. The valve member is yieldably urged by a spring 70 into a position such that flow through the ports 69 is blocked and all flow directed through the restricted port 68. Flow through the conduit 53 in the opposite direction will shift the valve member to its alternate position thus allowing flow through all of the ports at an increased rate. It will be understood that this valve will be connected in the system so that the flow of fluid to the actuator is substantially unrestricted while flow from the actuator is restricted.

To illustrate the versatility of the auxiliary hydraulic system of the present invention, the form shown in Figs. 5–10 of the drawings is equipped with a selector valve V–2 arranged for the control of two auxiliary actuators A–2 and A–3. It will be understood that this is only exemplary and that the valve may be constructed for the control of one or of more than two auxiliary actuators, if desired. The connection of the valve V–2 to the main hydraulic system has also been modified to adapt it for hydraulically locking and unlocking the main actuator, thus making it unnecessary to employ mechanical locking means for that purpose.

Referring to Fig. 5 of the drawings, it will be observed that the selector valve V–2 comprises a plunger 71 axially shiftable in a bore in a casing 72. Shifting of the plunger is effected by a hand lever 73 pivoted as at 74 on the tractor body and operatively connected with the valve plunger by a link 75. The particular valve illustrated has six positions but it will be understood that the number will vary according to the number of auxiliary actuators to be controlled.

In incorporating the modified form of auxiliary hydraulic system in a tractor main hydraulic system of the type disclosed, the pump discharge 41 is carried to a port in the valve casing 72 and a companion port connects with the main actuator cylinder 20 by way of a supply passage 41'. A pressure relief valve 44' may be interposed in a passage 76 branching from the passage 41' to protect the main actuator against excessive pressure developed by the load imposed thereon.

The valve casing also has three pairs of axially spaced ports, one set of which terminates branch passages 77, 78 and 79 which communicate through a common passage 80 with the pump discharge 41. These branch passages are desirably isolated from the main system by a check valve 81 interposed in the passage 80. A pressure relief valve 82 associated with the passage 80 protects the auxiliary actuators from excessive pressure.

The other set of ports in the valve casing include two ports connected respectively with the auxiliary actuators A–2 and A–3 by way of passages 83 and 84. The third port, in this instance the central one, terminates in an exhaust passage 85 in which the flow restricing means of orifice 45 is interposed.

While the operation of the modified auxiliary hydraulic system will be readily apparent upon inspection of the drawings, a brief description appears to be desirable. To place the system in operation, the quadrant lever 30 is operated to shift the control valve plunger 35 to open position, or in other words, to open the pump intake so that the pump delivers fluid under pressure through the discharge passage 41. With the selector valve plunger 71 in its No. 4 position, as shown in Fig. 5, pressure fluid delivered by the pump is directed through the check valves 59 and 81, passages 80, 78 and 85, and through the orifice 45, so that the standby pressure is maintained in the system.

Auxiliary actuator A–2 may be operated by shifting the valve plunger to the No. 2 position, shown in Fig. 9. To exhaust fluid from the auxiliary actuator, the valve plunger is shifted to the No. 3 position, shown in Fig. 8, in which the actuator is connected to exhaust through the orifice 45.

Similarly, to operate the actuator A–3, valve plunger 71 is shifted to the No. 6 position, shown in Fig. 6, and to exhaust fluid from that actuator, the plunger is shifted to the No. 5 position connecting the actuator to exhaust through the orifice 45.

To condition the main system for normal operation, it is only necessary to shift the valve plunger 71 to its No. 1 position, as shown in Fig. 10, in which the pump discharge is directed to the main actuator A by way of the supply passage 41'. It is to be noted that in this position of the selector valve, the other elements of the auxiliary hydraulic system are rendered ineffective and control is restored to the draft control mechanism of the tractor. In other words, the operation and return of the main actuator may be effected through the action of the control valve V in precisely the same manner as when the auxiliary hydraulic system is absent.

The selector valve V–2 in the form illustrated may be utilized for the control of a single auxiliary actuator, if desired, by simply connecting the supply passages 83 and 84 as by a passage 86 leading to that actuator, as shown in Fig. 11. The actuator may then be operated by shifting the valve plunger 71 to either the No. 2 position or the No. 6 position. Return of the actuator occurs with the valve plunger in either the No. 3 or the No. 5 position.

The auxiliary hydraulic system illustrated in Fig. 13 is quite similar to that shown in Fig. 1, with a modification of the connection to the auxiliary hydraulic actuator A–4 which permits substantial amplification of the selector valve V–3. More particularly, with the connection shown, control may be effected with a three position valve of the type shown which has a plunger 87 slidable in a bore in a casing 88. The usual hand lever 60 is provided for shifting the valve plunger. As in the first described system, the main hydraulic actuator A is mechanically locked against operation by the stay bars 43 when the system is to be employed for operating auxiliary equipment.

In the system shown in Fig. 13, the pump discharge 41 is connected by way of a passage 89 with a port in the valve casing 88 and also directly with the auxiliary actuator A-4 by way of a branch passage 90, a check valve 91 and a passage 92. The latter passage also extends to a port in the valve casing spaced axially from the port terminating the pressure passage 89. As in the case of the selector valve V-1, the exhaust passage 56 opens through a port at the casing 88 and the flow restricting orifice 45 is interposed in the exhaust passage.

To place the system in operation, the plunger 35 of the control valve V is shifted by manipulation of the quadrant lever 30 to open the pump intake 40. Pressure fluid delivered by the pump is diverted to the sump through the orifice 45 when the selector valve V-3 is in its No. 2 position, as shown in Fig. 13. To bring about operation of the auxiliary actuator, the valve plunger is shifted to the No. 1 position, shown in Fig. 15, blocking the pressure passage 89 from the exhaust, thus causing the fluid to be directed through check valve 91 to the auxiliary actuator. By returning the valve plunger to the No. 2 position, fluid is locked in the auxiliary actuator while the pump discharge is diverted to exhaust as above explained.

To permit return of the auxiliary actuator under the influence of the load applied thereto, the valve plunger is shifted to the No. 3 position, shown in Fig. 14. This permits the fluid in the auxiliary actuator to exhaust through the orifice 45 and the pump discharge is simultaneously directed to exhaust through the orifice.

Figs. 16 and 17 of the drawings show the preferred construction of the selector valve for the auxiliary hydraulic systems of the present invention. While the valve illustrated employs the specific porting and plunger construction of that disclosed in the modified system of Fig. 13, it will be understood that the valves employed in the other systems may be similar structurally.

As shown in the drawings, casing 88 of the selector valve V-3 is a generally cylindrical body with an enlargement 93 projecting at one side. The casing has a cylindrical bore 94 for the accommodation of the plunger 87 and cross passages open into this bore through suitable ports. Thus, the enlargement 93 is formed with two diverging bores, one defining the passage 92 and the other opening into a lateral passage or bore adapted to be connected to the pressure passage 89. The intermediate portion of the main passage is counterbored to provide a seat for the movable member of the check valve 91, herein shown as a ball 95 urged into closed position by a spring 96. A suitable threaded fitting 97 is provided at the lower end of the enlargement for connection with a conduit leading to the auxiliary actuator A-4.

The lateral passage 89 in the valve casing opens into the bore 94 and also extends laterally through a connecting portion 98 threaded for attachment of a conduit or the like extending to the main hydraulic system. Connection with the exhaust passage 56 is provided by an elbow coupling 99 fixed to the upper portion of the casing to communicate with the bore 94 through a port 100.

The valve plunger 87 as shown is cylindrical in form and is formed with a section 101 of reduced diameter operative to connect the serveral ports as explained above in the operation of the auxiliary hydraulic system. Sealing rings 102 may be provided at opposite sides of the reduced portion to prevent leakage of pressure fluid from the valve.

The particular valve shown is adapted for mounting on the body of the tractor through the medium of screws or bolts utilized to secure certain elements of the tractor body in assembled relation. For this purpose, the casing is formed with a pair of integral lugs 103 which, in this instance, extend upwardly from the casing on opposite sides of the elbow member 99. These lugs are apertured for the passage of the mounting bolts.

It will be apparent from the foregoing that the invention provides an auxiliary hydraulic system of novel and advantageous construction for adapting the main hydraulic system of a tractor for the operation of auxiliary equipment. The auxiliary system permits the pump of the main system to be operated continuously and thus maintain a constantly available supply of fluid under pressure for the operation of the auxiliary equipment. While provision is made for maintaining the pressure in the system sufficient to operate the auxiliary equipment, it is kept low enough to preclude objectionable aeration or excessive heating of the fluid. The auxiliary system is simple in construction and very easy to install on a tractor without requiring structural modifications or changes which interfere with the normal use of the tractor.

I claim as my invention:

A hydraulic system for a tractor comprising, in combination, a pump, a fluid reservoir, a main actuator operatively connected with a load to be lifted, control means including a main valve operable in one position to initiate the delivery of pressure fluid to said main actuator by said pump for raising the load and in another position to initiate substantially unrestricted exhaust of fluid from the main actuator for lowering the load, an auxiliary actuator, an auxiliary valve connected by conduit means with the discharge side of said pump, with said reservoir and with said auxiliary actuator, means defining a flow restricting passage in the conduit means connecting the auxiliary valve with said reservoir, said auxiliary valve having a valve member shiftable into any one of a plurality of positions, said valve member being operable in one position while said main valve is set to supply fluid to the main actuator for directing fluid from the pump through said flow restricting passage to the reservoir to maintain a predetermined minimum pressure in said main actuator and being operative in another position to interrupt the flow of fluid through said flow restricting passage and initiate delivery of fluid at increased pressure to said main actuator and to said auxiliary actuator, said valve member being operative in still another position to direct the discharge of fluid from the auxiliary actuator through said flow restricting passage, and valve means interposed in the conduit means through which fluid is delivered from said pump to the auxiliary valve for preventing the auxiliary actuator from exhausting back through the main valve when the latter is set to initiate exhaust of fluid from the main actuator.

References Cited in the file of this patent

UNITED STATES PATENTS

| 1,394,245 | Berry | Oct. 18, 1921 |
| 2,397,042 | Pfost | Mar. 19, 1946 |
| 2,649,980 | Slomer | Aug. 25, 1953 |
| 2,672,802 | Bunting | Mar. 23, 1954 |
| 2,697,329 | Eichler | Dec. 21, 1954 |